US012456362B2

(12) United States Patent
Syed

(10) Patent No.: US 12,456,362 B2
(45) Date of Patent: Oct. 28, 2025

(54) COMMUNICATIONS BRIDGE WITH UNIFIED BUILDING ALARM PROCESSING

(71) Applicant: Tyco Fire & Security GmbH, Neuhausen am Rheinfall (CH)

(72) Inventor: Saleem Syed, Dubai (AE)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 383 days.

(21) Appl. No.: 17/966,272

(22) Filed: Oct. 14, 2022

(65) Prior Publication Data

US 2024/0127690 A1 Apr. 18, 2024

(51) Int. Cl.
*G08B 29/18* (2006.01)
*G08B 25/00* (2006.01)

(52) U.S. Cl.
CPC ......... *G08B 29/185* (2013.01); *G08B 25/001* (2013.01)

(58) Field of Classification Search
CPC ............................ G08B 29/185; G08B 25/001
See application file for complete search history.

(56) References Cited

U.S. PATENT DOCUMENTS 4,749,985 A * 6/1988 Corsberg ............... G08B 23/00 701/99
5,555,191 A * 9/1996 Hripcsak ................. G06F 17/18 709/224
6,119,125 A 9/2000 Gloudeman et al.
8,428,391 B2 4/2013 Park
8,532,839 B2 9/2013 Drees et al.
8,600,556 B2 12/2013 Nesler et al.
8,635,182 B2 1/2014 Mackay
8,863,018 B2 10/2014 Taylor et al.
9,286,582 B2 3/2016 Drees et al.
9,390,388 B2 7/2016 Drees et al.
9,568,910 B2 2/2017 Drees et al.
9,606,520 B2 3/2017 Noboa et al.
9,639,413 B2 5/2017 Drees et al.
9,753,455 B2 9/2017 Drees
10,139,792 B2 11/2018 Schmitt et al.
10,261,485 B2 4/2019 Drees et al.
10,402,767 B2 9/2019 Noboa et al.
10,607,476 B1 3/2020 Stewart et al.
10,607,478 B1 3/2020 Stewart et al.
10,629,038 B2 4/2020 Horgan et al.
10,726,711 B2 7/2020 Subramanian et al.
10,739,741 B2 8/2020 Wenzel et al.
10,788,798 B2 9/2020 Sinha et al.
10,832,563 B2 11/2020 Subramanian et al.
(Continued)

OTHER PUBLICATIONS

U.S. Appl. No. 17/834,768.

*Primary Examiner* — Steven Lim
*Assistant Examiner* — Son M Tang
(74) *Attorney, Agent, or Firm* — Foley & Lardner LLP

(57) ABSTRACT

A method includes obtaining, at a communications bridge, a first alarm and a second alarm from a domain system serving a facility, assigning, by the communications bridge, an alarm expiry time to the first alarm, labeling, by the communications bridge, the second alarm as noise based on whether the second alarm has a generation time before the alarm expiry time assigned to the first alarm, and providing the first alarm, the second alarm, and the labeling from the communications bridge to a cloud computing system.

18 Claims, 12 Drawing Sheets

(56) References Cited

U.S. PATENT DOCUMENTS 10,832,564 B2 11/2020 Subramanian et al.
10,916,121 B2 2/2021 Razak et al.
11,057,244 B2 7/2021 Schubert et al.
11,168,910 B2 11/2021 Alcala Perez
11,226,598 B2 1/2022 Oliver et al.
11,230,191 B1* 1/2022 Yatooma .................... B60J 5/10
11,272,011 B1* 3/2022 Laughton ............... G05B 17/02
11,449,015 B2 9/2022 Locke et al.
11,451,408 B2 9/2022 Park et al.
11,961,386 B2* 4/2024 Hoernicke ......... G05B 23/0272
2010/0019894 A1* 1/2010 Okada ................ G05B 23/0272 340/506
2010/0109860 A1* 5/2010 Williamson ........... G08B 29/16 340/508
2013/0179178 A1* 7/2013 Vemireddy ............ G06Q 10/00 705/2
2014/0167503 A1* 6/2014 Redpath .................... H02J 3/00 307/23
2015/0124087 A1* 5/2015 Jones, Jr. ............... G08B 15/02 348/143
2015/0379864 A1* 12/2015 Janchookiat .......... G06F 11/327 340/506
2016/0330219 A1* 11/2016 Hasan ................. H04L 63/1408
2017/0213303 A1 7/2017 Papadopoulos et al.
2017/0300193 A1 10/2017 Ray et al.
2018/0087790 A1 3/2018 Perez
2018/0096159 A1* 4/2018 Jacobson ............ G06F 21/6218
2018/0322770 A1* 11/2018 Srinivasan ......... G05B 23/0272
2018/0364654 A1 12/2018 Locke et al.
2019/0050414 A1* 2/2019 Maturana .............. G06F 16/164
2019/0114897 A1* 4/2019 Tappan .................. G08B 21/18
2019/0200168 A1* 6/2019 Stapleford ............ H04W 4/029
2019/0244492 A1 8/2019 Horgan et al.
2020/0013277 A1* 1/2020 Bickel .................. G08B 29/181
2020/0106633 A1 4/2020 Park et al.
2020/0110374 A1 4/2020 Piaskowski et al.
2020/0135008 A1* 4/2020 Horgan ................ G08B 29/185
2020/0159376 A1 5/2020 Goyal
2020/0243203 A1* 7/2020 Reddy .................... G08B 25/10
2020/0358630 A1 11/2020 Deligio et al.
2020/0379423 A1 12/2020 Wenzel et al.
2021/0081811 A1 3/2021 Brown et al.
2021/0116904 A1 4/2021 Schuster et al.
2021/0157284 A1 5/2021 Mahoney et al.
2021/0241595 A1 8/2021 Young et al.
2021/0381861 A1 12/2021 Brown et al.
2022/0004369 A1* 1/2022 Thiebaut-George ... G08B 13/00
2022/0044338 A1 2/2022 Smith
2022/0058556 A1 2/2022 Warake et al.
2022/0067851 A1* 3/2022 Sinha ..................... G06Q 50/06
2022/0076551 A1* 3/2022 Cho ....................... G08B 25/10
2022/0171347 A1 6/2022 Oliver et al.
2022/0244682 A1 8/2022 Walczyk et al.
2022/0275963 A1 9/2022 Raasch et al.
2022/0415158 A1* 12/2022 Hoernicke ........... G05B 19/418
2025/0012871 A1* 1/2025 Lee ...................... G01R 31/396

* cited by examiner

300

```
{
  "_id": "6229cc6ab1604c10d8af7171",
  "content": {
    "eventDetails": {
      "serverAddress": null,
      "http": null,
      "severity": 8,
      "priority": 0,
      "x733Severity": "Major",
      "message": null,
      "state": null,
      "alarmType": "UnsecureRecordingServer",
      "alarmId": "7229cc6ab1604c10d8af7171"
      "alarmExpiryTime": "ISODate(\\\"2022-03-13T13:01:14.417+03:00\\\")",
      "originalGeneratedTime": "ISODate(\\\"2022-03-13T13:01:14.417+03:00\\\")",
      "noise": false
    },
    "assets": [
      {
        "id": "f3ea5070-a8fa-4202-ae8c-99a32f862d52",
        "type": "Milestone.MIP-Camera.1.0.0",
        "name": "Hanwha Techwin XNP-6320RH (10.63.50.46) - Camera 1",
        "context": {
          "designation": "Subject"
        },
        "propertyActivity": [],
        "manufacturer": "Milestone",
        "model": "MIP-Camera",
        "version": "1.0.0",
        "account": null
      }
    ]
  },
  "account": null,
  "generatedTime": "ISODate(\"2022-03-10T13:01:14.417+03:00\")",
  "recordedTime": "ISODate(\"2022-03-10T13:01:14.432+03:00\")",
  "displayType": "Unsecure recording server alarm activity containing server details.",
  "formatterId": "E6CF580B-A7E2-42D2-8187-8C986BF39AC8",
  "version": null,
  "baseActivityType": "JCI.OpenBlueBridge.Chassis.Activity.Abstractions.AlarmActivity",
  "category": "Integrations.Video",
  "subCategory": "Integrations.Video.Recorder",
  "classType":
"JCI.OpenBlueBridge.Integration.Milestone.Activity.UnsecureRecordingServerAlarmActivity
",
  "idProperty": "Id"
}
```

FIG. 3

COMMUNICATIONS BRIDGE WITH UNIFIED BUILDING ALARM PROCESSING

BACKGROUND

The present disclosure relates generally to the field of building management systems (BMSs). A BMS is, in general, a system of devices configured to control, monitor, and manage equipment in or around a building. A BMS can include, for example, a variety of domain systems such as a HVAC system, a security system, a lighting system, a fire alerting system, any other system that is capable of managing building functions or devices, or any combination thereof. A facility may also be served by other domain systems, such as an access control system, a ticketing system, a scheduling system, an information technology system, a plumbing system, an audio-visual system, a telecom system, a networking system, etc. In some embodiments, such systems generate a variety of alarms indicative of malfunction of equipment (e.g., HVAC equipment failing to track a setpoint), occupant-related events (e.g., intrusion through a security feature), emergency events (e.g., fire detected by a fire alerting system), etc. Some systems may generate a large number of alarms, for example duplicate/repetitive alarms where a root cause of the alarm persists over time. Building operators struggle to monitor such large numbers of alarms from disparate domain systems, preventing building operators from efficiently resolving alarms and improving overall facility performance.

SUMMARY

One embodiment of the present disclosure is a method. The method includes obtaining, at a communications bridge, a first alarm and a second alarm from a domain system serving a facility, assigning, by the communications bridge, an alarm expiry time to the first alarm, labeling, by the communications bridge, the second alarm as noise based on whether the second alarm has a generation time before the alarm expiry time assigned to the first alarm, and providing the first alarm, the second alarm, and the labeling from the communications bridge to a cloud computing system.

In some embodiments, the method also includes providing the first alarm and the second alarm with a same alarm ID in response to labeling the second alarm as noise. In some embodiments, the method also includes generating, by the cloud computing system, an alarm list for the facility, wherein the first alarm and the second alarm are grouped in a shared entry of the alarm list based on the same alarm ID. The shared entry of the alarm list can include an occurrence count based on a count of alarms having the same alarm ID.

In some embodiments, the method includes generating, by the cloud computing system, a graphical interface including a plurality of alarm icons overlaid on a map or three-dimensional representation of the facility. The plurality of alarm icons include a shared icon representing both the first alarm and the second alarm in response to labeling the second alarm as noise. In some embodiments, the method includes obtaining a third alarm from an additional domain system serving the facility and reformatting the first alarm, second alarm, and third alarm to have a common data structure.

Another implementation of the present disclosure is a system. The system includes a cloud computing system and a communications bridge providing communications between the cloud computing system and a plurality of domain systems serving a facility. The communications bridge comprises circuitry programmed to label a plurality of alarms from the plurality of domain systems with generated times, alarm expiry times, and alarm IDs. Assigning the alarm IDs includes determining whether to reuse, for a second alarm, a first alarm ID from a first alarm based on whether the generated time for the second alarm is between the generated time for the first alarm and the alarm expiry time for the first alarm. The circuitry is also programmed to provide the plurality of alarms and the labels to the cloud computing system.

In some embodiments, determining whether to reuse, for the second alarm, the first alarm ID from the first alarm is further based on whether the first alarm and the second alarm are for a same device or equipment unit of the plurality of domain systems. In some embodiments, determining whether to reuse, for the second alarm, the first alarm ID from the first alarm is further based on whether the first alarm and the second alarm have a same alarm type.

In some embodiments, the cloud computing system is programmed to generate a report of the plurality of alarms by grouping the plurality of alarms based on the alarm IDs. The report may include a three-dimensional building model with icons for the alarm IDs overlaid on the three-dimensional building model. The cloud computing system may be programmed to generate the report using a digital twin of the facility. In some embodiments, the report indicates a count of the plurality of alarms which share the first alarm ID.

In some embodiments, the circuitry is further programmed to normalize the plurality of alarms from the plurality of domain systems to have a common data structure. Assigning the alarm IDs may also include, in response to determining to reuse the first alarm ID for the second alarm, determining whether to reuse the first alarm ID from the first alarm for a third alarm based on whether the generated time for the third alarm is between the generated time for the first alarm and the alarm expiry time for the second alarm.

In some embodiments, the cloud computing system is programmed to execute a rules-based fault suppression logic. The cloud computing system may also be programmed to automatically add a fault suppression rule to the rules-based fault suppression logic by processing the plurality of alarms using an artificial intelligence.

Another implementation of the present disclosure is a communications bridge. The communications bridge is configured to obtain a first alarm and a second alarm from the building system, assign an alarm expiry time to the first alarm, label the second alarm as noise based on whether the second alarm has a generation time before the alarm expiry time assigned to the first alarm, and provide the first alarm, the second alarm, and the labeling from the communications bridge to the remote computing resource.

In some embodiments, the communications bridge is configured to label the first alarm and the second alarm with a same alarm ID in response to labeling the second alarm as noise. The communications bridge may be configured to obtain a third alarm from an additional building system serving the facility, and reformat the first alarm, second alarm, and third alarm to have a common data structure.

In some embodiments, the communications bridge is configured to label the second alarm as noise further based on whether the first alarm and the second alarm are for a same device or equipment unit of the building system. In some embodiments, the communications bridge is configured to delete a third alarm in response to determining that the third alarm is for a same device as the first alarm, has a same generated time as the first alarm, and has a same alarm time as the first alarm.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 3 is a depiction of a labelled alarm as provided by a communications bridge of the unified building operations system of FIG. 1A, according to some embodiments.

DETAILED DESCRIPTION

Figure 1A:
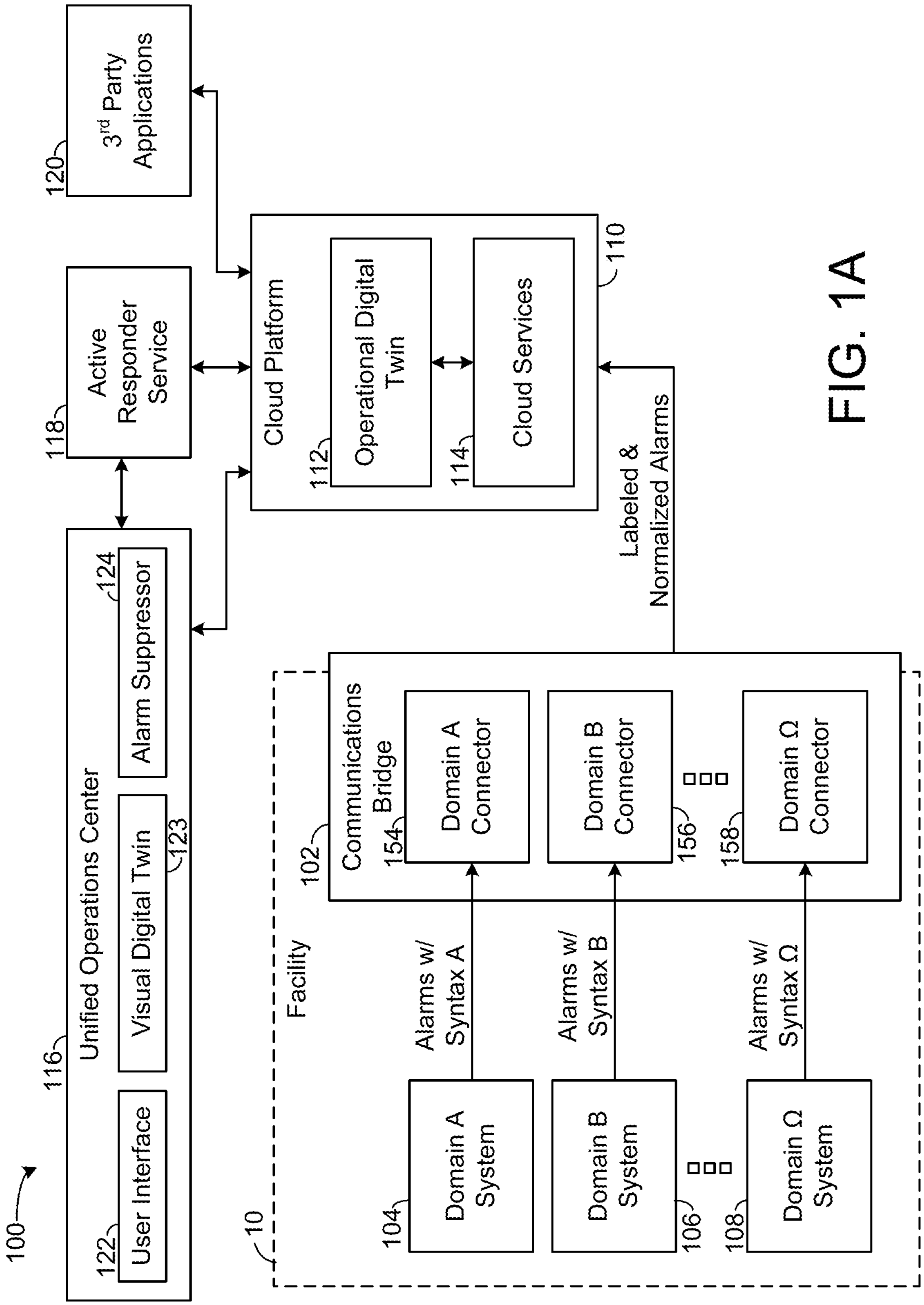
FIG. 1A is a block diagram of a unified building operations system, according to some embodiments.

Referring generally to the Figures, systems and methods for unified building alarm processing at communications bridge are shown, according to some embodiments. The unified building alarm processing described herein can handle alarms for multiple different building domain systems. Building domain systems correspond to different domains of a building, for example heating, ventilation, and/or cooling (HVAC) systems, lighting systems, fire alerting systems, access control systems, security systems, information technology (IT) networks, electricity systems, plumbing systems (e.g., running water, water heaters), intercom systems, and/or various other technologies that may be present at a building depending on the use or purpose of the building. For example, a stadium may include scoreboard systems, audio-visual systems, ticketing systems, turf care systems, merchant payment systems, etc. As another example, a hospital may include patient call and monitoring systems, room booking systems, medical device systems, etc. The terms "building domain systems" and "domain systems" are used synonymously throughout the present disclosure. The processes herein enable unified alarm processing from any combination of domain systems, including systems provided by different manufacturers and using different communications protocols, message syntaxes, or other differences that obstruct direct comparison or interoperability between different domain systems.

Conventionally, monitoring alarms from disparate building domain systems would require operators to separate monitor each separate system (e.g., view separate interfaces, programs, devices, etc. for the separate systems). Even if collected into a single set of displays (e.g., in a control room), large amounts of differently-formatted information is provided to a building operator. Such scenarios make it difficult or impossible for building operators to comprehend and respond to alarms in an efficient manner. Systems and methods disclosed herein address the technical challenge of surfacing alarms from multiple domain systems to a user in a manner which enables efficient reaction and resolution of alarms and quick understanding of building performance.

Additional challenges in monitoring complex buildings are created because building domain systems often push very large numbers of alarms, especially where a condition creating an alarm persists over time. For example, an access control system may generate an alarm in response to unauthorized opening of a door and may repeatedly generate the alarm so long as the door stays open, which can result in a large number of alarms (e.g., hundreds, thousands) if the door is propped open. As another example, an HVAC system may generate an alarm in response to a measured value (e.g., temperature) not tracking an expected value (e.g., temperature setpoint) in an expected manner, and may repeatedly push the alarm so long as a rule based on the values remains violated. As such, conventional systems may provide many alarms which may provide a building operator with no or limited new information, while also cluttering displays of alarm information and obfuscating important alarm information. Systems and methods disclosed herein address the technical challenge of handling such large numbers of alarms, including by providing a computationally efficient method for labeling alarms as noise and by providing clear views of alarms with suppression of alarm noise and duplicates.

In some embodiments, the innovations described herein are provide using a communications bridge. The communications bridge may be a version of OpenBlue® Bridge by Johnson Controls International plc. As described in further detail below, the communications bridge provides communications between building/facility domain systems which serve a building/facility (e.g., which include hardware in the built environment) and computing resources such as a remote computing system or cloud computing system (e.g., such as OpenBlue® Cloud by Johnson Controls International plc.). In the embodiments herein, the communications bridge is configured to label certain alarms as noise and/or reuse alarm identifiers (IDs) while processing alarm data in a manner which facilitates communications (e.g., in a data standardization/normalization process). Applying labels at the communications bridge efficiently leverages the system architecture utilizing such a communications bridge, including such that alarms are labeled with noise or alarm ID information before being provided to the cloud computing system. Such an approach can significantly reduce a computation burden on the cloud computing system which would otherwise be needed to achieve similar results.

Referring now to FIG. 1A, a block diagram a unified building operations system 100 is shown, according to some embodiments. The system 100 is shown as serving a facility 10, which may be a building, collection of buildings (co-located or dispersed), outdoor facility, campus, smart city, stadium, etc. in various embodiments. The system 100 includes a communications bridge 102 providing communications between (e.g., one-directional, two-directional) any number of domain systems (shown as domain A system 104, domain B system 106, through domain Ω system 108) and a cloud platform 110 which provides a digital twin 112 and cloud services 114. The system 100 is also shown as including a unified operations center 116, active responder service 118, and third party applications 120 interoperating with the cloud platform 110, with the unified operations center 116 providing a user interface 122 and alarm suppressor 124.

The communications bridge 102 is shown as including domain connectors corresponding to each of the domain systems, illustrated in FIG. 1A as domain A connector 154 for domain system A 104, domain B connector 156 for domain B system 106, through domain system 108 for domain Ω connector 158. A number of domain connectors corresponds to a number of domain systems included in the system 100. In some embodiments, domain A system 104 is an HVAC system, domain B system 106 is an access control or security system, and domain Ω system 108 is a fire alerting system, with the domain systems being various types of systems in various embodiments (e.g., HVAC systems, lighting systems, fire alerting systems, access control systems, security systems, information technology (IT) networks, electricity systems, plumbing systems (e.g., running water, water heaters), intercom systems, and/or various other technologies).

As illustrated in FIG. 1A, each domain system provides alarms to the communications bridge 102. The domain systems can create alarms according to rules and logic executed therein. For example, if domain Ω system 108 is a fire alerting system, domain Ω system 108 may provide an alarm in response to detection of fire or smoke by a device of domain Ω system 108 or response to a fire pull being manually manipulated. As another example, if domain B system 106 is an access control or security system, an domain B system 106 may provide an alarm in response to detecting that a door was opened without authorization, determining that a security door is propped open, or otherwise detecting an intruder. As another example, if domain A system 104 is an HVAC system, domain A system 104 may generate an alarm in response to violation of one or more rules for measured values of building or equipment conditions, for example if a measured temperature or other condition exceeds a threshold value or fails some other error assessment. Various other types of systems can provide various other alarms in response to various other faults, equipment or device failures, emergency events, situations requiring user resolution, etc.

FIG. 1A illustrates that the alarms are provided from the different domain systems with different syntaxes. Because the domain systems 104-108 are different types of systems and may be from different manufacturers, etc., the format and other aspects of the information communicated by each system for a given alarm may be different. For example, domain A system 104 may provide alarms in syntax A, where a date of the alarm is formatted in a dd/mm/yy format and where a criticality of an alarm is expressed in text as "low," "medium," or "high," while domain B system 104 may provide alarms in syntax B, where a date of the alarm is formatted in yy-mm-dd format and where a criticality of an alarm is expressed as a binary value (e.g., 0 for not critical, 1 for critical). Such differences prevent direct comparison or compilation of alarms in a meaningful way without normalization into a common format and syntax. The alarms can also be provided by the different domain systems 104-108 in different communications protocols or over different IT or OT networks, in various embodiments.

The communications bridge 102 is programmed to receive alarms from the various domain systems 104-108, including in various syntaxes and via different IT/OT networks and using different communication protocols, and to normalize such alarms into a common format and syntax. As shown, the communications bridge 102 includes a connector for each domain system. The different connectors 154-158 may be separate hardware devices, for example including the appropriate input ports, etc. to enable communication with the different domain systems 104-108, may be implemented in software on common circuitry of the communications bridge 102, or some combination thereof. The domain A connector 154 receives alarms from domain system A 104 and normalizes the alarms into a common syntax. The domain B connector 156 receives alarms from domain system B 106 and normalizes the alarms into the common syntax. The domain Ω connector 158 receives alarms from domain system Ω 108 and normalizes the alarms into the common syntax. Each domain connector 154-158 can be customized (e.g., programmed) using specific knowledge of the corresponding syntax used by the corresponding domain system, thereby enabling the communications bridge 102 to handle any variety of domain systems across different implementations.

The communications bridge 102 is further configured to label the alarms in conjunction with normalizing the alarms into a common syntax. Labeling the alarms can include adding information (e.g., as labels, tags, metadata, etc.) to the alarms. Labeling performed by the communications bridge 102, for example by the domain connectors 154-158, can include executing process 200 of FIG. 2, described in detail below. Labeling an alarm can result in an alarm payload (e.g., package, data object including labels) being added to the alarm as shown in FIG. 3, according to an example in some embodiments, which is also described in detail below. As described in further detail with reference to FIGS. 2-3, labeling alarms at the communications bridge 102 can denote the alarms as noise, duplicates, repeated occurrences of a pending alarm (e.g., by using a shared alarm ID), etc. so that such information is stored with each alarm before the alarms are provided to cloud platform 110. Further, such labeling is added in conjunction with (e.g., during) normalization of alarms, such that the labeling is performed at a stage and by components which would otherwise already be editing alarm data labels, tags, metadata, etc., is being performed at a stage which has knowledge of the syntaxes used by the corresponding domain systems, and is performed at a stage when full alarm information is present (e.g., before any loss that may occur as part of normalizing alarms and/or uploading or saving alarms to cloud storage).

In some embodiments, the communications bridge 102 is programmed to delete duplicate alarms, such that deleted duplicate alarms are not uploaded to the cloud platform 110, thereby saving communications bandwidth and memory demands on the cloud platform 110. For example, some domain systems may provide duplicates of certain alarms, for example with immaterial differences (e.g., a variable labeling the alarm as an event or alert). The communications bridge 102 (e.g., the domain connectors 154-158) may be programmed to detect alarms which share a generated time, a type of alarm, and a corresponding device or equipment unit (i.e., the device or equipment unit for which the alarm is generated, which is in a fault state, which detected fire, which detected an intrusion, etc.) are identical, and delete such alarms as duplicates. For certain domain systems, duplicate deletion in this manner can remove half or more of all alarms before upload to the cloud platform 110, saving bandwidth, memory requirements, and data clutter.

As illustrated in FIG. 1A, the communications bridge 102 provides labeled and normalized alarms to the cloud platform 110. The cloud platform 110 may be the OpenBlue® Cloud by Johnson Controls International plc. For example, the communications bridge 102 can cause the labeled and normalized alarms to be transmitted over one or more networks (e.g., over the Internet) to the cloud platform 110. The cloud platform 110 receives the labeled and normalized alarms from the communications bridge 102, for example at cloud services 114 of the cloud platform 110. The cloud services 114 can include, among various features in various embodiments, data storage (memory, database, etc.) for the labelled/normalized alarms received from the communications bridge 102. Accordingly, in the system of FIG. 1A, alarms including labels, normalized/standardized metadata, etc. can be received and stored at the cloud platform 110. The cloud platform 110 need not itself perform any functions for labeling and normalizing/standardizing the alarms. The cloud services 114 can also include various other applications, for example OpenBlue® applications by Johnson Controls International plc.

The cloud platform 110 is also shown as including operational digital twin 112. The operational digital twin 112 is a digital twin of the facility 10 and the equipment/devices therein, including equipment/devices of the domain systems 104-108. The operational digital twin 122 (which can include both space twin and asset twin) is the aggregation of all possible data types and data sets, both historical and real-time, directly or indirectly related to a given physical asset or managed virtual asset or a managed point or set of assets in a single, unified location. The collected data may be clean and contextualized, linked in a way that mirrors how things are or would be linked in the real world, and made consumable depending on the use case or smart experience. In some embodiments, the operational digital twin 112 may be provided using approaches described in PCT Patent Application PCT/US2022/034101, filed Jun. 17, 2022, the entire disclosure of which is incorporated by reference herein. In some embodiments, the operational digital twin 112 uses a three-dimensional building model, for example a building information model (BIM) file along with spatial and relationship information which indicates where equipment/devices of the domain systems 104-108 are located relative to the building model.

In some embodiments, alarms are provided into the operational digital twin 112. Each alarm may include information identifying the relevant device, equipment unit, space, etc. to which it applies, which can be used to associate each alarm with an asset of the digital twin 112 and a location in the three-dimensional building model. Populating the operational digital twin 112 with alarm information is streamlined by the labeling and normalization provided by the communications bridge 102. With respect to syntax normalization, population of the operational digital twin 112 is simplified because digital twin population deals with the normalized syntax rather than attempting to handle a large number of different syntaxes (data structures, data formats, etc.) in a digital twin population process. With respect to labeling, in particular labeling of alarms as noise and/or grouping alarms under shared alarm IDs can greatly reduce the number of unique alarms to be populated into the digital twin. Alarms labeled as noise can be omitted from population into the digital twin (or used only to increase an occurrence count of an associated alarm populated into the digital twin) and while a single instance of alarms having a shared alarm ID can be populated into the digital twin without loss of relevant alarm information. Further, because such alarms are labeled with such information before the alarms arrive at the cloud platform 110, no such alarm labeling and assessment need be performed in a digital twin population step.

The unified operations center 116 is shown as interoperating with the cloud platform 110. In some embodiments, the unified operations center 116 is provided as a part of the cloud platform 110. In some embodiments, the unified operations center 116 is provided using separate hardware than the cloud platform 110 (e.g., communicable via the internet with the cloud platform 110). The unified operations center 116 enables one or more operators (e.g., human technicians) to monitor facility operations, including across multiple domain systems 104-108, and to adjust facility operations, order maintenance, order emergency response, or take other interventional actions.

As shown in FIG. 1A, the unified operations center 116 includes user interface 122 and visual digital twin 123. The user interface 122 can be a graphical user interface hosted by the unified operations center, for example accessible via an internet browser to a device having appropriate access credentials and/or provided via a display terminal included with the unified operations center 116. Examples views that can be provided by the user interface 122 are shown in FIGS. 5-9 and described in detail with reference thereto below. As described in further detail with reference to FIGS. 5-9, the unified operations center 116 can provide the user interface 122 using the operational digital twin 112 and the labeled alarms. For example, the visual digital twin 123 can provide a two-dimensional and/or three-dimensional building model which can be displayed via the user interface 122 and overlaid with icons for unique, non-noise alarms at appropriate locations on the three-dimensional building model. The user interface 122 can also include various other information, lists, searches, filters, visualizations, etc. of alarm information which leverages the normalization and labeling performed by the communications bridge 102 to efficiently provide alarm information to facility operators in a meaningful way that enables responsive interventions to improve facility performance. The user interface 122 can be provided using the teachings of U.S. patent application Ser. No. 17/834,768, filed Jun. 7, 2022, the entire disclosure of which is incorporated by reference herein.

FIG. 1A further shows the unified operations center 116 as including alarm suppressor 124. Alarm suppressor 124 can suppress certain alarms, including alarms not labelled as noise, for example using a rule-based alarm suppression approach. A rules-based approach can be created by defining which alarms should be suppressed (e.g., do not display alarms having certain properties) or by defining which alarms should be displayed and suppress all others (e.g., only display alarms having certain properties). In some embodiments, suppression rules can be adjusted by operators, for example via user interface 122. Alarm suppression logic can also be adjusted by operation of an artificial intelligence, for example as explained below with reference to FIG. 10. Suppression rules can be based on normalized alarm properties (i.e., properties/labels/metadata/etc. normalized by the communications bridge 102) such as, for example, severity, alarm type, asset type, and alarm type.

Suppression rules can also be based on information from the operational digital twin 112, for example space type, particular space (building, floor, room, etc.), or other category. Alarms stored by the cloud platform 110 can be updated based on such rules with a flag/label indicating each alarm as suppressed or not suppressed, in some embodiments. The user interface 122 may be provided such that suppressed alarms are not displayed, for example in an effort to reduce clutter and direct an operator's attention to a desired subset of alarms.

FIG. 1A is also shown as including active responder service 118. The active responder service 118 can include tools for contacting and deploying emergency response resources (e.g., firefighters, security personnel, etc.) or other building/facility interventions (e.g., maintenance activities) in response to alarms. The active responder service 118 may be accessible via the unified operations center 116, in some embodiments. The active responder service 118 enables the system 100 to initiate responses to and resolution of certain alarms through deployment of emergency or other personnel to a space associated with the alarm. In some embodiments, the operational digital twin 112 and/or three-dimensional building model (e.g., visual digital twin 123) can be used to provide navigation assistance to such personnel to facilitate resolution of alarms.

FIG. 1A further shows that third party applications 120 can interoperate with the cloud platform 110, for example to make use of labelled and normalized alarms received at the cloud platform 110. For example, the cloud platform 110 may provide an application programming interface for enable interactivity with third party applications 120. In embodiments where the cloud platform 110 stores alarm data, including for alarms labeled as noise, suppressed alarms, etc., all such data may be available to third party applications 120 to the extent third party applications 120 have utility for such information. Accordingly, the approaches herein can be adapted to support various functionalities, for example advanced analytics, key performance indicators, visualizations, etc. that may be provided by third party applications 120.

Figure 1B:
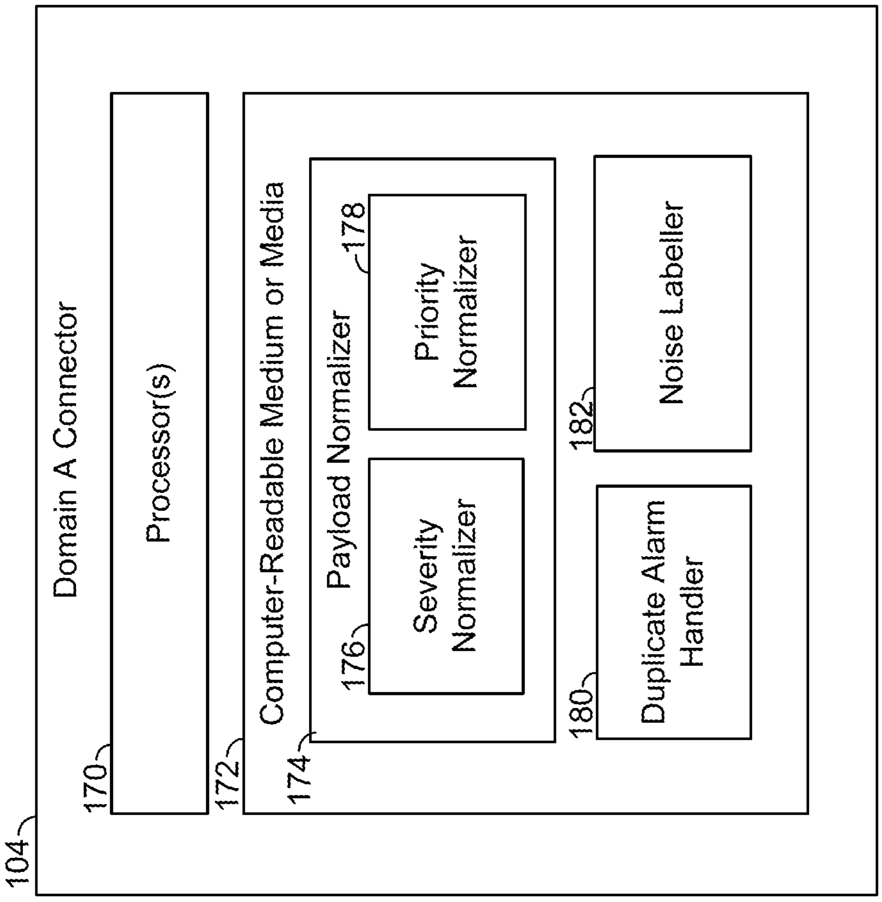
FIG. 1B is a block diagram of a domain connector of a communications bridge of the unified building operations system of FIG. 1A, according to some embodiments.

Referring now to FIG. 1B, a detailed view of the domain A connector 104 is shown, according to some embodiments. The domain B connector 106 and the domain Ω connector 108 may be configured similar to the domain A connector 104, in some embodiments, while being adapted for the corresponding different domains.

The domain A connector 104 is shown as including one or more processors 170 and one or more computer-readable media 172. The processor(s) 170 may be implemented as one or more general-purpose processors, application specific integrated circuits (ASICs), field programmable gate arrays (FPGAs), digital signal processors (DSPs), other suitable electronic processing components, or a combination thereof. The one or more computer-readable media 172 (e.g., computer memory) can be implanted as RAM, ROM, NVRAM, Flash Memory, hard disk storage, solid state storage, etc. and may store data and/or computer-readable instructions (programming, logic, code) executable by the processor(s) 170 for executing the features attributed herein to the domain A connector 104 and components thereof.

The one or more computer-readable media 172 is/are shown as including a payload normalizer 174 including a severity normalizer 176 and a priority normalize 178, a duplicate alarm handler 180, and a noise labeler 182, which can be implemented as different programs, sets of instructions, and/or hardware, etc. in the one or more computer-readable media 172.

The payload normalizer 174 is configured to normalize incoming domain data from the corresponding domain system (e.g., domain A system 104). In the example shown, the payload normalizer 174 is configured to normal various aspects of alarms having Syntax A from domain A system 104 to enable the domain A connector 102 to output an alarm data object (payload) having a normalized syntax and data structure. An example normalized alarm is shown in FIG. 3 and described with reference thereto below. The payload normalizer 174 may be enabled to normalize various attributes, for example any of the attributes shown in FIG. 3. In the example of FIG. 1B, the payload normalizer 174 includes a severity normalizer 176 to normalize an alarm severity and a priority normalize 178 to normalize an alarm priority.

The severity normalizer 176 normalizes the severity of alarms from a classification used by a corresponding domain system to a standard used by the cloud platform 110, unified operations center 116, etc. In some embodiments, the normalized severities provided by the severity normalizer 176 comply with the X.733 industry standard. In some embodiments, the normalized severities are selected from a list including: Critical, Major, Minor, Warning, and Intermediate. The severity normalizer 176 is programmed with logic (e.g., rules-based logic) for taking severity indication in a different severity syntax from the domain system (e.g., numerical rankings of severity from 1 to 5, etc.) and translate such severity index into the standard/normalized syntax and format. An alarm payload is thereby provided with a normalized severity attribute.

The priority normalizer 178 provides the alarm with a normalized priority, i.e., a priority in a syntax/format/etc. used by the cloud platform 110, unified operations center 116, etc. In some embodiments, the priority normalizer 178 translates from a priority provided by a corresponding domain system (i.e., a priority level indicated in Syntax A by the domain A system 104) to a priority attribute in a normalized syntax/format, for example using a rules-based translation logic. In some embodiments, the priority normalizer 178 generates the alarm priority based on other alarm information, for example based on a type of the alarm, the domain involved, etc. Such priority assignments can be based on user preferences and may be user-adjustable (e.g., via communications via the unified operations center 116 and user interface 122, in some embodiments). The normalized priority output from the priority normalizer 178 can be Critical, High, Medium, or Low, in some embodiments.

The duplicate alarm handler 180 is enabled to detect and delete duplicate alarms, i.e., alarms provided at the same time and corresponding to the same fault/event/etc. (e.g., having materially the same information/attributes/etc.). For example, some domain systems will output duplicate alarms, for example with slight, immaterial variations (e.g., a state flag showing different values which may not be relevant for the applications contemplated herein). The duplicate alarm handler 180 can delete (ignore, not process, not forward to the cloud platform 110), alarms having the same alarm type, corresponding entity (i.e., equipment unit, device, etc.), and time stamp as another alarm. Only one of multiple such duplicate alarms is preserved for other operations described herein, and memory and data transmissions savings can be achieved by omitting other processing on the duplicate alarms and avoiding transmitting the duplicate alarm from the domain A connector 154 to the BMS could 110. In experimental application, such an approach was found to reduce alarms (and corresponding processing, storage, bandwidth) by 75% for some domain systems.

Figure 2:
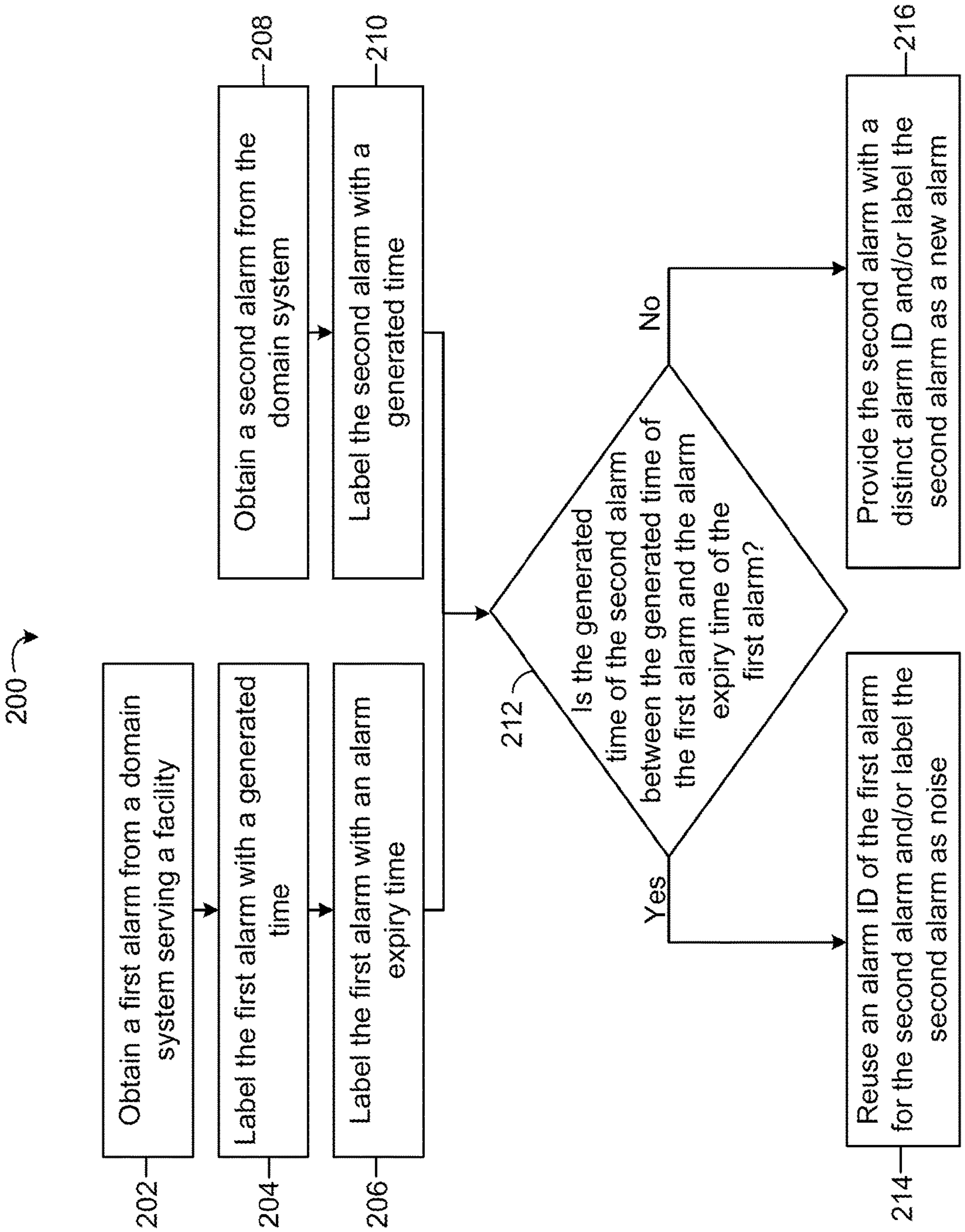
FIG. 2 is a flowchart of a process that can be executed by the system of FIG. 1A, according to some embodiments.

The noise labeler 182 is configured to label certain alarms as noise as the alarms are processed by the domain A connector 104. Noise labeling can occur in coordination with payload normalization by the pay load normalization 174, such that the normalized alarms include indications as to whether the alarms are noise. The noise labeler 182 can provide operations as shown in FIG. 2 and described with reference thereto below, and can provide labelled alarms in accordance with the example of FIG. 3, in some embodiments. Noise labeling can include applying alarm IDs and/or changing a noise flag of an alarm, as described below with reference to FIG. 2 and elsewhere herein.

Based on operations of the pay load normalizer 174 and the noise labeler 182, resulting alarm payloads (data objects, etc.) can outputted from the domain A connector 104 having normalized attributes including alarm severity, alarm priority, and a noise indicator (indicating an alarm as noise or not noise). Such payloads may be handled by the cloud platform 110 and may be accessible by and/or transmitted to the unified operations center 116, in some embodiments.

Figure 1C:
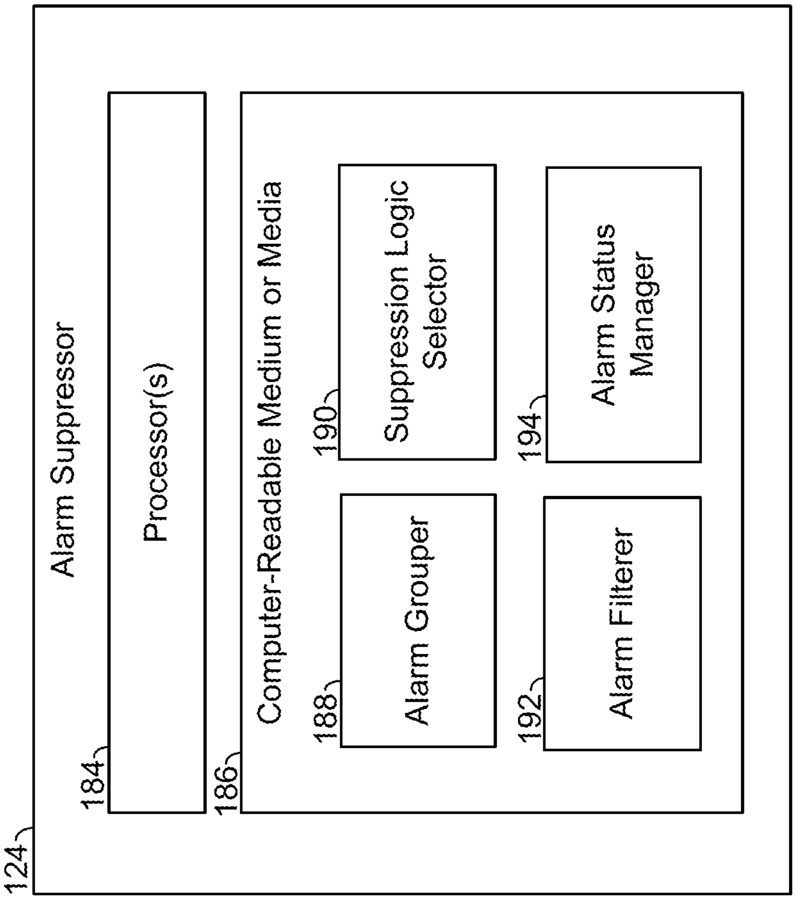
FIG. 1C is an alarm suppressor of a unified operations center of the unified building operations system of FIG. 1A, according to some embodiments.

Referring now to FIG. 1C, a detailed block diagram of the alarm suppressor 124 is shown, according to some embodiments. The alarm suppressor 124 is shown as including one or more processors 184 and one or more computer-readable media 186. The processor(s) 184 may be implemented as one or more general-purpose processors, application specific integrated circuits (ASICs), field programmable gate arrays (FPGAs), digital signal processors (DSPs), other suitable electronic processing components, or a combination thereof. The one or more computer-readable media 186 (e.g., computer memory) can be implanted as RAM, ROM, NVRAM, Flash Memory, hard disk storage, solid state storage, etc. and may store data and/or computer-readable instructions (programming, logic, code) executable by the processor(s) 184 for executing the features attributed herein to the alarm suppressor 124 and components thereof.

The computer-readable medium or media 186 is shown as including an alarm grouper 188, a suppression logic selector 180, an alarm filterer 192, and an alarm status manager 194. The alarm suppressor 124 can receive alarms substantially as output from the communications bridge 102 (e.g., as output from the domain A connector 154, domain B connector 156, etc.), i.e., alarm payloads having normalized attributes with labeling indicating alarms as noise or not noise (e.g., attribute value, flag, alarm IDs, etc.).

The alarm grouper 188 is configured to group alarms. For example, the alarm group 188 may group all alarms having a common alarm ID into a group, so that all such alarms can be treated as one alarm plus additional occurrence of the alarm labeled as noise. Such an operation can leverage the labeling applied by the communications bridge 102 and described in detail with reference to FIGS. 2 and 3 below, so that the alarm grouper 188 can apply simple logic based on alarm IDs, noise indicators, etc., thereby saving processing time, computing power requirements, etc. as compared to an alternative approach where the alarm suppressor 124 is presented with raw alarm data. The alarm grouper may also determine a count of alarm occurrence for each group based on the number of alarms sorted into the group.

In some embodiments, the alarm grouper 188 is also enabled to group alarms based on other categorizations or criteria, for example based on user defined groupings. For example, alarms (or groups of alarms) can be further grouped based on alarm type, asset, type, space type, and/or severity, in some embodiments. Such alarm groupings can be provided by the alarm grouper 188, for example for presentation to a user via user interface 122.

The suppression logic selector 190 is configured to enable user selection of suppression logic to be implemented for alarm suppression. The suppression logic selector 190 can provide interoperations with the user interface 122 to prompt a user to input suppression logic and to receive such user inputs from a user. For example, a user may input rules defining alarms to not show (or to show) in reports, dashboards, etc. (examples of which are described below). For example, the suppression logic selector 190 can enable selection of suppression rules based on normalized attributes such as alarm severity, alarm type, manufacture, asset type, and space time, for example linked with Boolean operators (e.g., AND, OR). For example, the suppression logic selector 190 can enable user definition of rules whereby all alarms will be suppressed except those which meet a set of criteria (e.g., such as "Severity"="critical" OR "high" AND "Alarm Type"="Controller Failure" OR "Controller Tamper Alarm."). The suppression logic selector 190 can allow for on-demand updates and changes to such logic, in some embodiments. In some embodiments, changes to logic will only apply for new, incoming alarms whereas historical alarms remain as suppressed/not suppressed based on the logic in use at the time of such alarms.

The alarm filterer 192 provides for filtering incoming alarms, for example based on the suppression logic selected via the suppression logic selector 190. For example, the alarm filterer 192 may receive all incoming alarms and suppress (e.g., delete, hide, etc.) a subset of those alarms based on compliance with selected suppression logic (or some other desired filter). The alarm filterer 192 leverages normalized attributes applied by the communications bridge 102, which simplifies the processing, computing power requirements, latency, etc. at the alarm filterer 192 level (as compared to an alternative approach where the alarm filterer 192 acts on raw data). The alarm filterer 192 can further act on groups of alarms, such that the alarm filterer 192 need only analyze each group once (as opposed to additional processing power/time that would be needed to analyze each alarm including noise individually). Accordingly, the alarm falterer 192 can pass a desired set of grouped alarms through to other operations of the unified operations center 116.

The alarm status manager 194 provides for updating alarm statuses. In some embodiments, alarms with certain status can be suppressed, deleted, removed, etc. (e.g., statuses such as expired, resolved, etc.). The alarm status manager 194 may enable users to change alarm status (e.g., via user interface 122). For example, alarm statuses may include Active (corresponding to a default statue of the alarm when generated/received), Duplicate (a user selectable-status indicating that a user thinks the alarm is a duplicate), False (user-selectable to indicate the user thinks the alarm is false), Ignore (user-selected to indicate that the alarm is not of interest), Resolved (indicating that a cause of an alarm has been addressed), Abandoned (which may be automatically applied after a certain amount of time—e.g., at an alarm expiry time). In some embodiments, the alarm status manager 194 allows a user to change the status of a given alarm only once, after which the state is saved and locked. Alarms can be presented, suppressed, provided with options, etc. differently depending on alarm status, in various embodiments.

Referring now to FIG. 2, a flowchart of a process 200 for labeling alarms is shown, according to some embodiments. Process 200 can be provided as part of normalization or standardization processes executed by the communications bridge 102, in some embodiments. In some embodiments, each domain connector (shown in FIG. 1A as domain A connector 154, domain B connector 156, through domain Ω connector 158 is programmed to execute process 200 (e.g., independently)(e.g., using noise labeler 182). The present disclosure contemplates instructions stored on one-or-more non-transitory computer-readable media that, when executed by one or more processors, cause the one or more processors to execute the operations of process 200.

At step 202, a first alarm is obtained from a domain system serving a facility. The domain system can be any domain system, for example for the types of building domains discussed above. Step 202 can include receiving the first alarm at the communications bridge 102, for example via an IT or OT network.

At step 204, the first alarm is labeled with a generated time. The generated time may be provided with the alarm by the domain system and can indicate a time when the alarm was generated by the domain system (e.g., when a condition triggering the alarm occurred). The generated time may be the time when the alarm was received by the communications bridge 102, for example if the domain system is not configured to provide a time with the alarm. Labeling the first alarm with the generated time can include providing a data object for the first alarm with a property that indicates the generated time.

At step 206, the first alarm is labeled with an alarm expiry time. In some embodiments, the alarm expiry time is set to be a particular amount of time after the generated time (e.g., five hours, five days). For example, the particular amount of time after the generated time by which the alarm expiry time is set may be based on the type of the alarm and/or the relevant building/facility domain. In some embodiments, the amount of time used in setting the alarm expiry time is user-defined and may be user-adjustable. Labeling the first alarm with the alarm expiry time can including a providing a data object for the first alarm with a property that indicates the alarm expiry time.

At step 208, a second alarm is obtained from the domain system. The second alarm can have a same alarm type and be for a same device or equipment unit as the first alarm. Obtaining the second alarm at step 208 can include receiving the second alarm at communications bridge 102, for example via an IT or OT network.

At step 210, the second alarm is labeled with a generated time. The generated time may be provided with the second alarm by the domain system and can indicate a time when the second alarm was generated by the domain system (e.g., when a condition triggering the alarm occurred). The generated time may be the time when the second alarm was received by the communications bridge 102, for example if the domain system is not configured to provide a time with alarms output from the domain system. Labeling the second alarm with a generated time can include providing a data object for the second alarm with a property that indicates the generated time.

At step 212, a determination is made of whether the generated time of the second alarm is between the generated time of the first alarm and the alarm expiry time of the first alarm. Step 212 can include checking whether the generated time of the second alarm is after the generated time of the first alarm and checking whether the generated time of the second alarm is before the alarm expiry time. Step 212 may also include verifying that the first alarm and the second alarm have a same alarm type and are for a same device or unit of equipment.

If the generated time of the second alarm is between the generated time of the first alarm and the alarm expiry time of the first arm ("Yes" at step 212), process 200 proceeds to step 214 where an alarm ID for the first alarm is reused for the second alarm and/or the second alarm is labeled as noise. The generated time of the second alarm being between the generated time of the first alarm and the alarm expiry time of the first arm can indicate that the second alarm is repetitive and would not provide substantial new information to an operator, as the first alarm is already active over that period. The second alarm can thus be labeled as noise, for example by updating an attribute/property of data object for the second alarm. The second alarm can thus also be provided with a same alarm ID as the first alarm, indicating for subsequent processing that the second alarm is an instance, re-occurrence, etc. of the first alarm. For example, the second alarm may have been generated because an error condition or detected issue persisted, as opposed to being generated because an independent, new issue arose. In such examples, step 214 provides labeling to the second alarm indicating that the second alarm need not be treated as an independent, separate alarm for future processing (e.g., for visualizations, for display on graphical user interfaces). In some embodiments, step 214 includes increasing an occurrence count attribute of the first alarm.

If the generated time of the second alarm is not between the generated time of the first alarm and the alarm expiry time of the first arm ("No" at step 212), process 200 proceeds to step 216 where the second alarm is provided with a distinct alarm ID (i.e., different than the first alarm) and/or the second alarm is labeled as not being noise (e.g., as being a new alarm). For example, if the generated time of the second alarm is after the alarm expiry time of the first alarm, the second alarm may correspond to a new issue or re-development of an issue (e.g., following resolution or expiration of the first alarm). Step 216 can include causing an attribute/property of the second alarm to indicate the second alarm as new, original, non-noise, etc.

The process 200 can be repeated for any number of alarms, with new alarms being introduced as the second alarm and fed through corresponding logic of process 200. In some embodiments, step 214 includes updating the alarm expiry time of the first alarm in response to another alarm being labeled as noise and being indicated as repetitive of the first alarm. For example, step 206 can be repeated with the alarm expiry time set to be the same amount of time after the later alarms as used in setting the original alarm expiry time. For example, if the first alarm occurs at t=0 and the alarm expiry time was set to t=5 (i.e., 5 time units later), and the second alarm occurs at t=3 (i.e., between 0 and 5), the second alarm will be labeled as noise and the alarm expiry can be advanced to t=3+5=8. The updated alarm expiry time can be used to determine whether a third alarm is noise, and so forth. The alarm expiry time can thus be advanced as new instances of repeat alarms are generated, indicating that the underlying condition causing the alarm is ongoing. For example, process 200 can provide for operations including labeling a plurality of alarms from the plurality of domain systems with generated times, alarm expiry times, and alarm IDs, where assigning the alarm IDs includes determining whether to reuse, for a second alarm, a first alarm ID from a first alarm based on whether the generated time for the second alarm is between the generated time for the first alarm and the alarm expiry time for the first alarm. Process 200 is thus adaptable to handle any number of alarms to label certain alarms as noise and/or to reuse alarm IDs as a result of assessing relative generated times and alarm expiry times of the alarms.

Referring now to FIG. 3, an illustration of an alarm 300 as output from process 200 and/or from the communications bridge 102 is shown, according to some embodiments. FIG. 3 illustrates the alarm 300 as being a data object, payload, package, etc. including various attributes, labels, tags, fields, etc. describing a particular alarm. In an embodiment including the alarm 300, other alarms output by the communications bridge 102 are formatted in a similar manner with the same set of attributes, labels, fields, etc. (although some values for some fields will differ across alarms). Various other alarm formats can be used in various embodiments.

In the example of FIG. 3, the alarm 300 is shown as including, among other fields, an "alarmID," an "alarmExpiryTime," an "originalGeneratedTime" and "noise." These fields can be set according to process 200 and/or to facilitate process 200. For example, the attribute "noise" can be set to "false" (indicating not noise) or "true" (indicating that the alarm is noise), following the logic of process 200. The "alarmID" can also be set according to the logic of process 200. In the example of FIG. 3, the alarm 300 is determined in process 200 to not be noise (i.e., to be a distinct alarm), such that the "noise" flag/label is set to "false" and the "alarmID" is distinct from previous alarms.

FIG. 3 shows a variety of other attributes/labels that can be normalized, standardized, etc. by the communications bridge 102. For example, FIG. 3 shows a "severity" and "priority" attributes on a numerical scale, whereas the alarm as originally provided by a domain system may have provided a different syntax, e.g., a word-based rating (e.g., high, medium, low). In some embodiments, the alarm "priority" is assigned according to a user-customizable logic for assigning different priorities to different alarm types, for example to allow for customization based on what different operators consider to be higher priorities given their preferences, roles, risk tolerance, etc. FIG. 3 also illustrates that all times and dates have been standardized to an international standard format. The alarm 300 is also shown as indicating an alarm type, asset information about the device/equipment for which the alarm is generated (e.g., asset ID, name, manufacturer, model, version). Various other information is included, and can be adapted as may be desirable in various embodiments. The alarm 300 and many similarly-formatted alarms can thus be received at the cloud platform 110 already containing normalized information and noise labels which facilitate efficient handling at the cloud platform 110.

Figure 4:
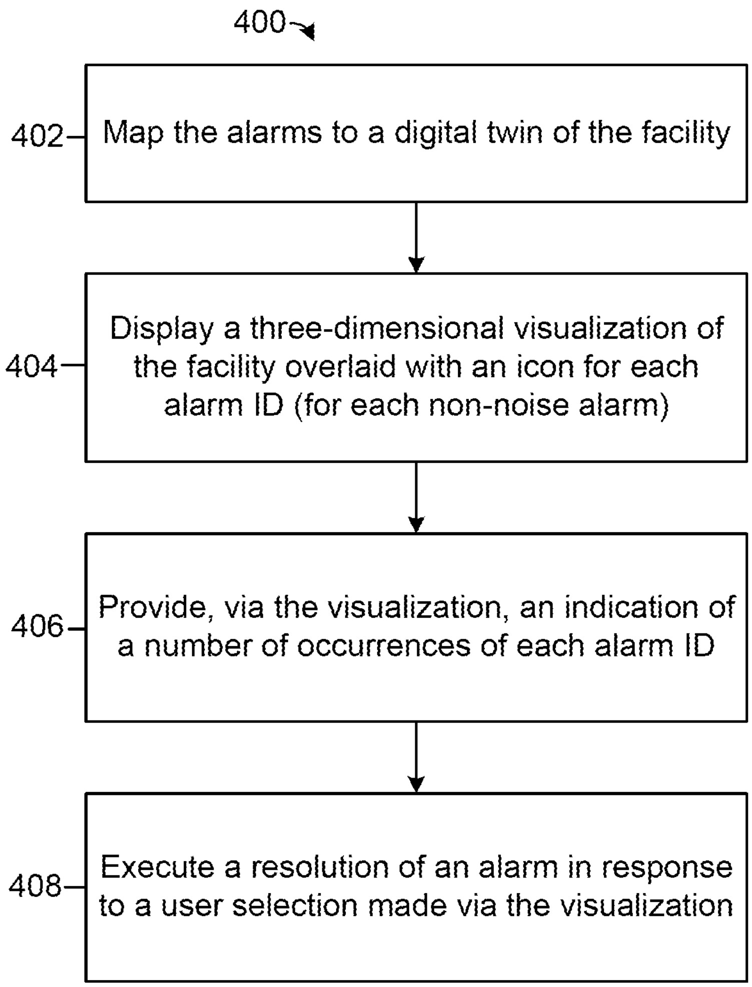
FIG. 4 is flowchart of a process that can be executed by the system of FIG. 1A, according to some embodiments.

Referring now to FIG. 4, a flowchart of a process 400 for utilizing labeled alarms is shown, according to some embodiments. The process 400 can be executed by the cloud platform 110, the unified operations center 116, and/or some combination thereof in various embodiments. In some embodiments, the process 400 includes operations of the active responder service 118. The present disclosure contemplates instructions stored on one-or-more non-transitory computer-readable media that, when executed by one or more processors, cause the one or more processors to execute the operations of process 400.

At step 402, the alarms are mapped to a digital twin of the facility (e.g., operational digital twin 112). Mapping the alarms to the digital twin can include creating or using connections between assets and spaces represented in the digital twin. For example, an asset ID included with the alarm can be used to associate the alarm with an asset already represented in the digital twin. Mapping the alarms to the digital twin can use features of PCT Patent Application PCT/US2022/034101, filed Jun. 17, 2022, the entire disclosure of which is incorporated by reference herein. The digital twin 112 can thus be updated to include alarm information, including alarm information that includes the labels, normalization, etc. applied by the communications bridge 102.

At step 404, a three-dimensional visualization of the facility is displayed, with an icon overlaid on the three-dimensional visualization for each distinct alarm, i.e., for each distinct alarm ID and/or for each alarm not labeled as noise. Various other alarms suppression can also be applied to further limit the number of alarms displayed. Example interfaces that can be generated in step 404 are shown in FIGS. 5-9 and described below. Step 404 can use the digital twin with the alarm information as provided by step 402 (e.g., via interoperation between operational digital twin 112 and visual digital twin 123). Step 404 can thereby provide a visualization of alarms and where the alarms are located relative to the facility, while noise is easily hidden (e.g., not displayed) by utilizing the labeling provided to the alarms by the process 200 and/or by the communications bridge 102.

At step 406, an indication of a number of occurrences of each alarm ID is provided via the visualization. For example, a user may select an icon for an alarm to view more information about the alarm. A window, view, pop-up, etc. may display which provides further information including a number of occurrences of the alarm. The number of occurrences of the alarm may be a count of alarms which share the alarm ID and/or a count of the original alarm and all alarms labeled as noise due to their relationship with the original alarm (e.g., having a same alarm type, same device/equipment, and a generated time between the generated time and expiry time of the original alarm). Information about how many instances of an alarm are being generated by a domain system thus remains available to a user without the clutter, obfuscation, etc. that would result from displaying all such noise as separate alarms.

At step 408, a resolution of an alarm is executed in response to a user selection made via the visualization. The visualization can be provided with an option for a user to initiate resolution of an alarm, for example an option to change a control strategy for a device or equipment unit to correct for the issue creating the alarm, an option to order maintenance for a device or equipment unit, an option to request an emergency response via active responder service 118, etc. Step 408 can include receiving selection of such an option and then automatically executing the requested action, for example in a way that tangibly affects building operations (e.g., due to a change in device operations, due to completion of a maintenance activity, by controlling an access control system to allow emergency responders to an area of a facility, etc.). Resolution of alarms can thus be achieved in a streamlined, efficient manner following the teachings herein.

Referring now to FIGS. 5-9, various views that can be provided in the user interface 122 are shown, according to some embodiments. The views can be generated by the unified operations center 116 using information from the cloud platform 110, including alarm information and operational digital twin 112, for example by or using the visual digital twin 123. In some embodiments, the views are generated using teachings of U.S. patent application Ser. No. 17/834,768, filed Jun. 7, 2022, the entire disclosure of which is incorporated by reference herein.

Figure 5:
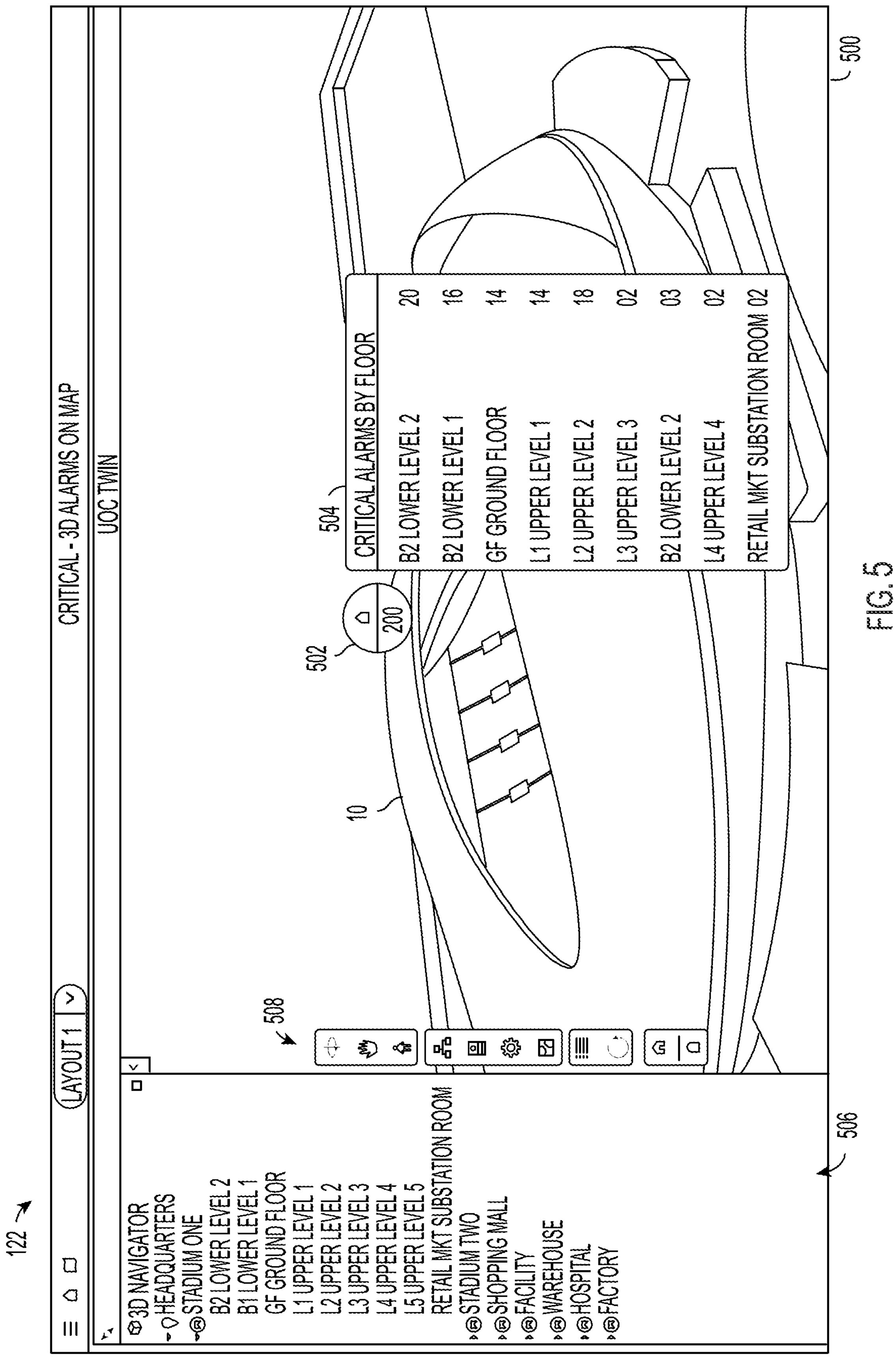
FIG. 5 is a first view in a graphical user interface provided by the system of FIG. 1A, according to some embodiments.
Figure 6:
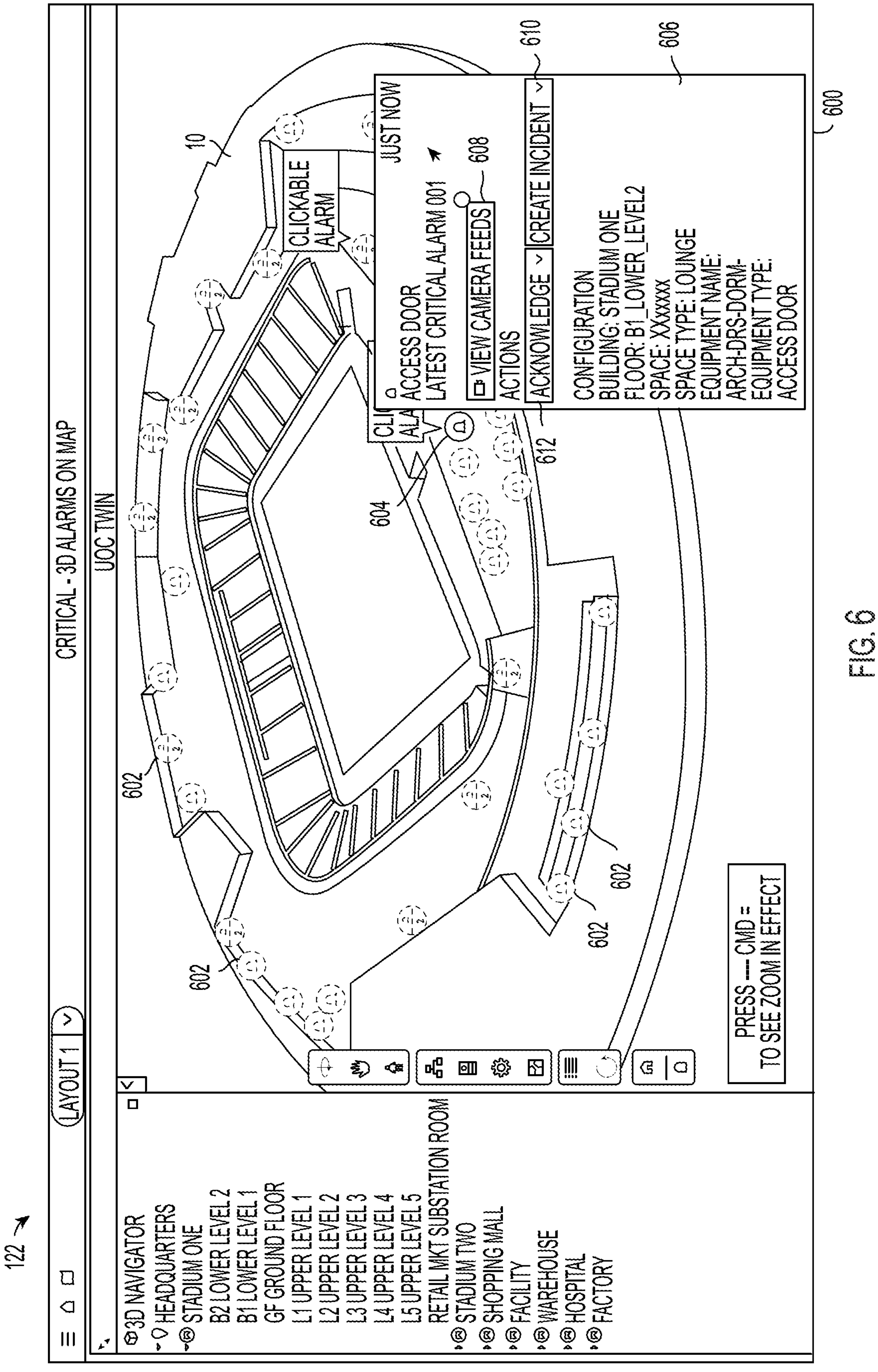
FIG. 6 is a second view in a graphical user interface provided by the system of FIG. 1A, according to some embodiments.

FIG. 5 shows a first view 500 in the user interface 122. The first view 500 includes a three-dimensional visualization of the facility 10, for example based on a BIM file stored as part of the virtual digital twin 123. An alarm icon 502 is overlaid on the visualization of the facility 10 and indicates that multiple alarms are available to be viewed. A user can select the alarm icon 502 to access a list 504 of floors (or other spaces) of the facility 10 which indicates a number of alarms (e.g., critical alarms) for each floor (or space). A user can thus get a quick overview of the whole facility and the number of available alarms. Selecting an entry on the list 504 can allow the user to navigate to a view of a particular floor or space and the associated alarms, for example to a second view 600 as shown in FIG. 6. The first view 500 also includes a navigation pane 506 and three-dimensional view controls 508 which allow a user to navigate to different views and otherwise adjust the visualization displayed as part of the user interface 122.

FIG. 6 shows a second view 600 in the user interface 122, for example a view reached by selecting a particular floor from the list 504 of the first view 500. In the second view 600, the visualization of the facility 10 is cut-away so that a user can see a selected floor, including into the various spaces, rooms, etc. of the selected floor. Alarm icons 602 are displayed at locations with correspond alarms, for example one alarm icon for every spaces for which an alarm is active. The alarm icons 602 allow the user to spatially see where the alarms are occurring around the selected floor. Many alarm icons 602 are shown in the second view 600.

As shown in FIG. 6, a user has selected a particular alarm icon 604 of the many alarm icons 602, such that a window 606 is displayed showing details of the selected alarm. The window 606 can provide the equipment type, equipment name, alarm type, etc., thereby providing relevant information about the alarm to a user. The window 606 can include a view camera feeds button 608 which is selectable to cause the user interface 122 to display a real-time video feed of a space associated with the alarm, thereby allowing a user to assess the space and the alarm. Other options to initiate a response to the alarm (e.g., button 610) or update a status of the alarm (button 612) are also provided in the window 606. The second view 600 thereby enables a user to understand, react to, and update the status of alarms.

Figure 7:
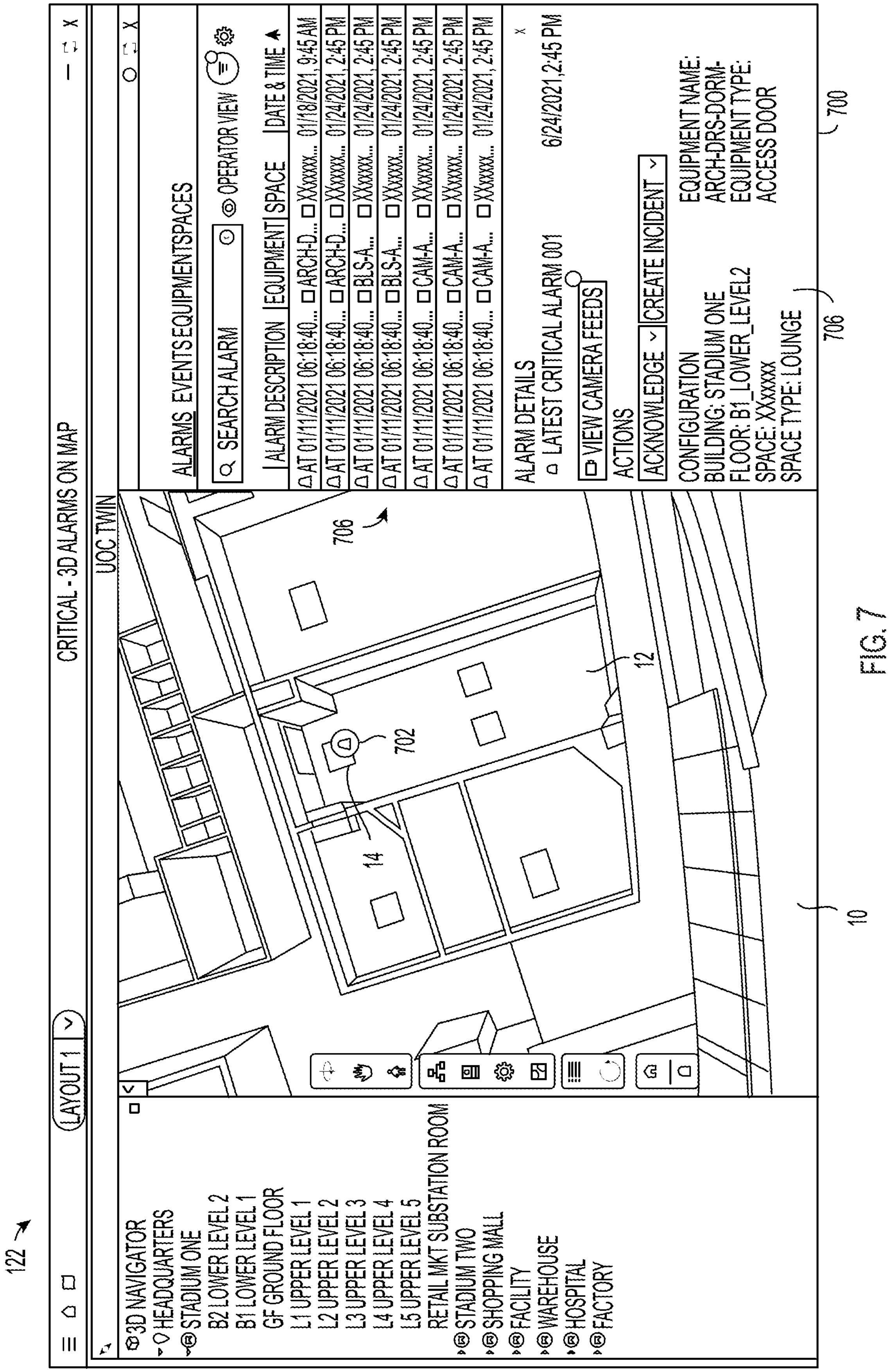
FIG. 7 is a third view in a graphical user interface provided by the system of FIG. 1A, according to some embodiments.

As shown in FIG. 7, the user interface 122 can be further zoomed to center on a particular space of facility 10, for example a selected room 12. FIG. 7 shows a third view 700 where the three-dimensional visualization is focused on a selected room 12 and shows equipment in the selected room 12 including an equipment unit 14 overlaid with an alarm icon 702. The third view 700 allows a user to see the particular equipment unit affected by an alarm and where the particular equipment unit is located in a space. The third view 700 also includes a window 706 similar to the window 606 of the second view 600, which shows detailed information about a selected alarm. The third view 700 also includes an alarm list 706 which shows a list of alarms for the selected room 12, for example including current and previous (e.g., expired, abandoned, resolved) alarms.

Figure 8:
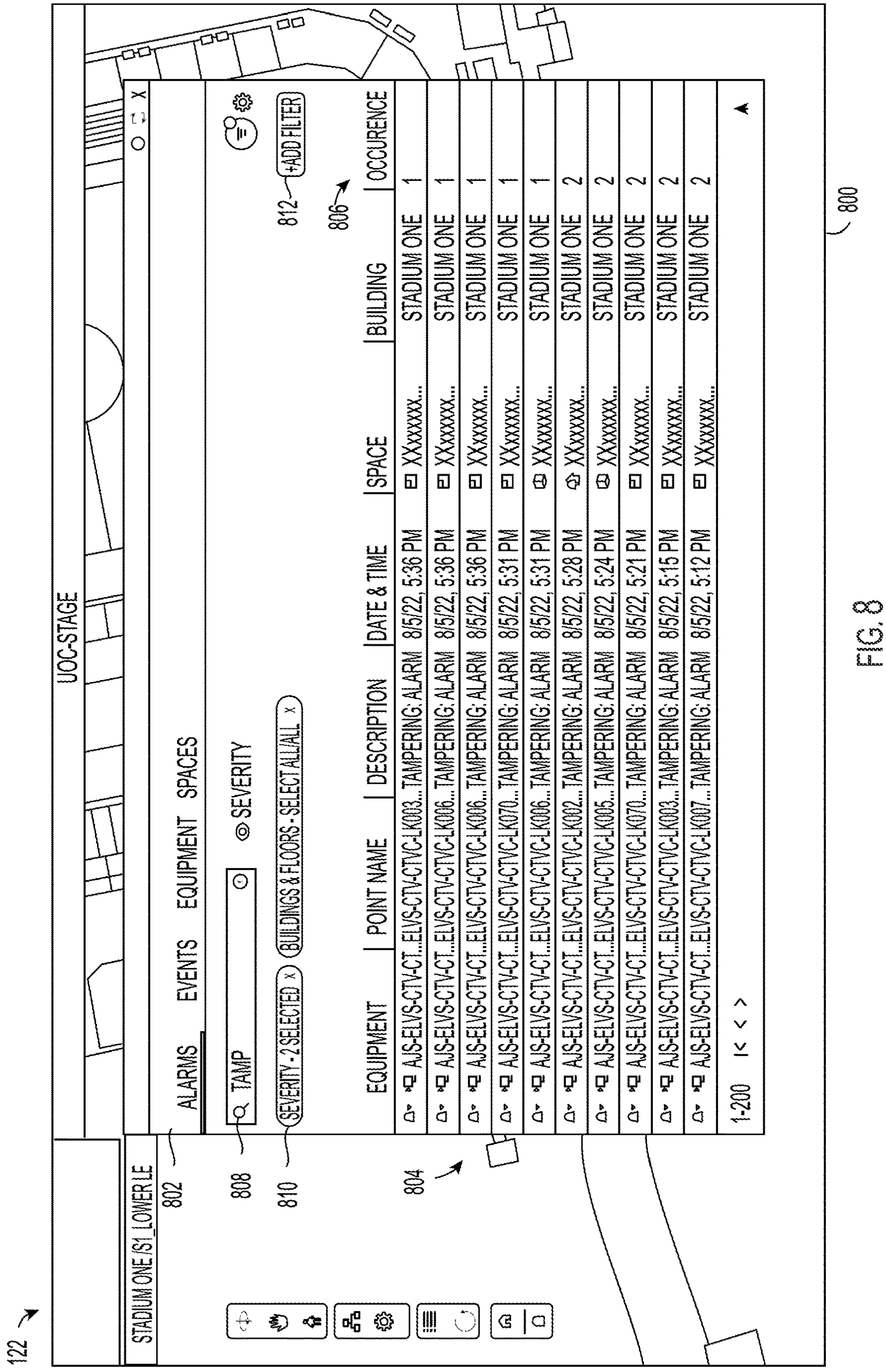
FIG. 8 is a fourth view in a graphical user interface provided by the system of FIG. 1A, according to some embodiments.

As shown in FIG. 8, a fourth view 800 in the user interface 122 can include a window 802 including a list 804 of alarms for the facility 10. The list 804 can include various information about the alarm (e.g., taken from the alarm attributes/labels as shown in the example of FIG. 3). The list 804 includes an occurrence count column 806 which displays a count of occurrences of each alarm (e.g., representing a number of noise alarms, a number of alarms with the same alarm ID, etc. as determined using process 200). By using the occurrence count column 806 rather than separate displaying multiple list entries for multiple occurrences of the same alarm, noise is omitted from the list 804 while occurrence count information (which may be of interest to the user) is still presented. The list 804 can display alarms that are results of a search entered to search bar 808. The list 804 can display alarms that meet criteria of filters 810, with an add filter button 812 allowing addition of more filters. The list 804 will update in response to a change in filters 810. Filtering can be done by facility, floor, space, etc., by domain, by equipment type, by alarm type, by severity, by criticality, by time, by occurrence count, etc. Such filtering is enabled by normalization of alarm properties by the communications bridge 102 as described above.

Figure 9:
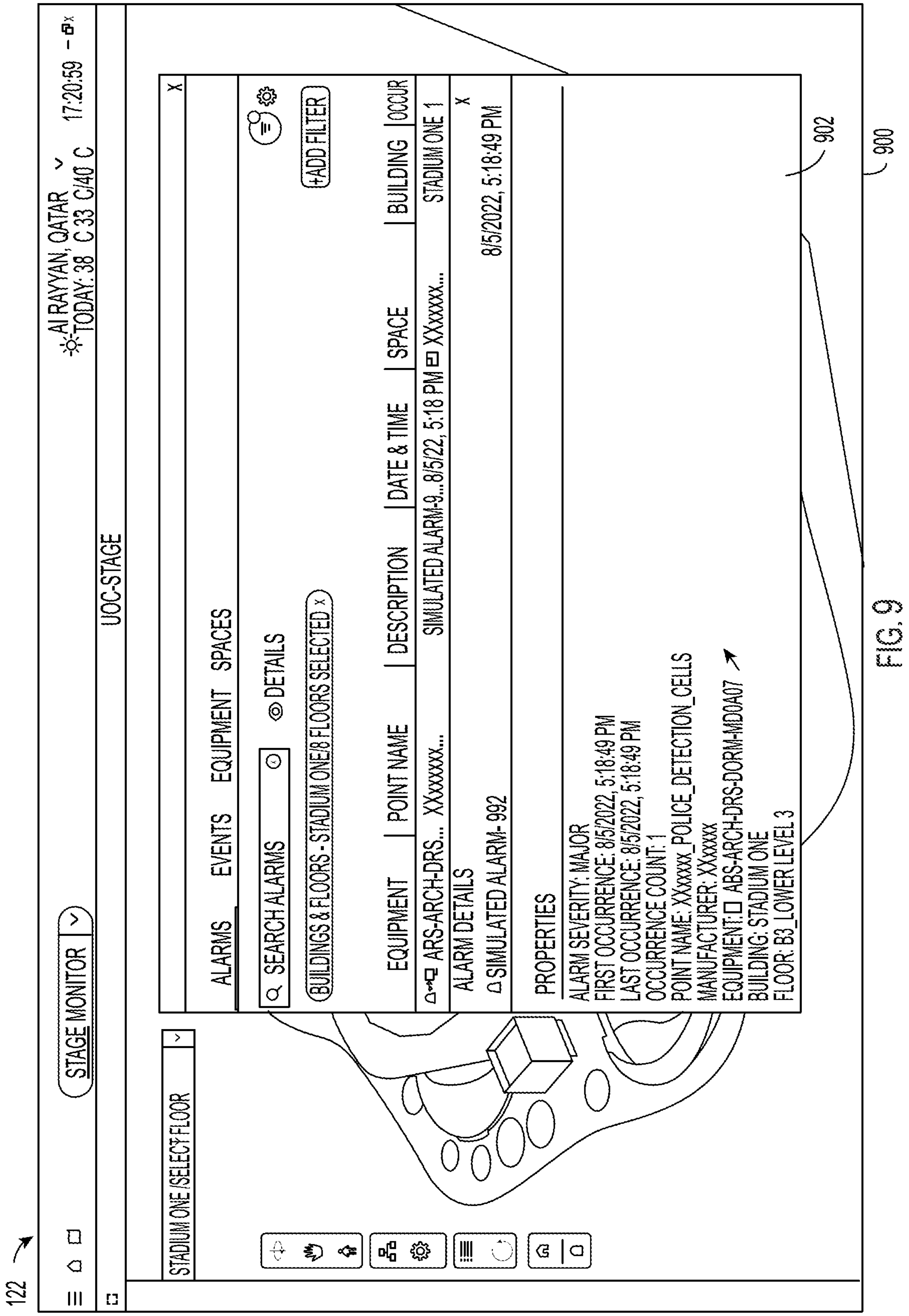
FIG. 9 is a fifth view in a graphical user interface provided by the system of FIG. 1A, according to some embodiments.

An entry on the list 804 can be selected to navigate to a fifth view 900 as shown in FIG. 9. As illustrated in FIG. 9, a window 902 can be provided which shows details of a selected alarm. The details can includes the severity, timing, occurrence count, equipment name/type, location, etc. of an alarm. The window 902 can provide similar information, options, etc. as window 606 of FIG. 6 and window 706 of FIG. 7, for example. The user interface 122 thereby allows a user to access detailed alarm information by navigating through the three-dimensional building view (as in FIGS. 5-7) or by filtering, searching, etc. a list view (as in FIGS. 8-9).

By providing the first view 500, the second view 600, the third view 700, the fourth view 800, and the fifth view 900, the user interface 122 can provide a user with a variety of intuitive ways to view and assess building alarms without encountering noise, clutter, misleading duplication, etc. that might otherwise occur in other embodiments. Such efficient views are enabled by the alarm labeling and normalization performed by the communications bridge 102 and by use of the operational digital twin 112. Building operations and management can thus be improved by the teachings herein.

Figure 10:
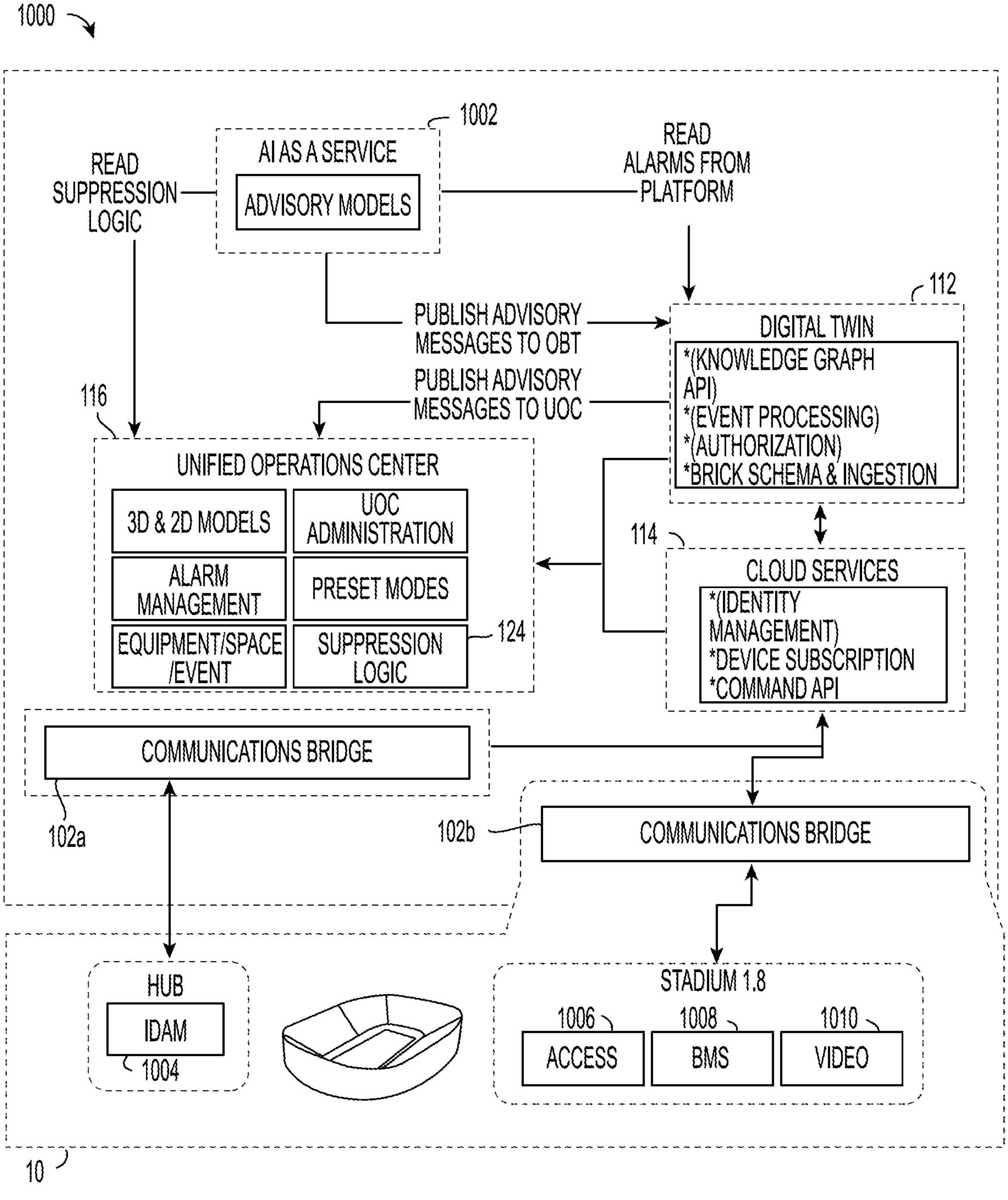
FIG. 10 is a block diagram of a unified building operations system having an artificial intelligence service, according to some embodiments.

Referring now to FIG. 10, a block diagram of a system 1000 is shown, according to some embodiments. The system 1000 can include similar elements as the unified building operations system 100, and is shown in FIG. 10 as including a communications bridge **102*a*, a communications bridge 102*b*, operational digital twin 112, cloud services 114, and unified operations center 116. Further, example domain systems 1003 are shown, illustrated as identity and access management (IDAM) 1004, access system 1006, building management system (BMS) 1008, and video system 1010. The system 1000 further includes Artificial Intelligence (AI) as a Service 1002. FIG. 10 illustrates that the communications bridge 102 can include a first portion (shown as communications bridge 102*a*) provided remote from the facility 10 and a second portion (shown as communications bridge 102*b*) provided at the facility 10**, for example enabled to handle different domain systems depending on operational details of the domain systems.

The AI as a Service 1002 of the system 1000 is configured to provide advisory messages relating to alarm suppression logic. As illustrated in FIG. 10, the AI as a Service 1002 is configured to read suppression logic from the unified operations center 116 (e.g., from alarm suppressor 124). The AI as a Service 1002 is also enabled to read alarms from the operational digital twin 112. The AI as a Service 1002 is configured to used artificial intelligence to generate advisory messages based on the existing suppression logic and the alarms. For example, the AI as a Service 1002 may detect when a new alarm type is provided which is not explicitly suppressed in suppression logic. The AI as a Service 1002 can then correlate the new alarm type with a suppression logic preference and allocate a probability score, for example a probability score indicative of how likely it is that a user would want to suppress that new alarm type given existing suppression logic for suppression other types of alarms. If the probability score meets a threshold, the AI as a Service 1002 can publish and advisory message (e.g., to the operational digital twin 112 which can provide the message to the unified operations center 116 as shown in FIG. 10). The alarm suppressor 124 can then be updated with the new suppression logic recommended by the AI as a Service 1002. In some embodiments, a user is prompted to confirm or reject the edit to the suppression logic and the recommended updated from the AI as a Service is implemented or rejected based on the user's response.

With respect to the domain systems shown in FIG. 10 as IDAM 1004, access system 1006, BMS 1008, and video system 1010, the present disclosure contemplates a wide variety of domain systems that can be include, for example including the systems as shown in the following table:

| System | Capability |
|---|---|
| Access Control System | Provides ability to command and monitor doors, controllers, and field points. |
| Video System | Provides ability to view live and pre-recorded feeds and control PTZ cameras |
| BMS | Monitor and control of critical parameters from HVAC |
| IDAM (Identity & Asset Management) | Provide ability to monitor the status of IDAM modules |
| Intercom/Help Point System 1 | Provides ability to monitor the status and send prerecorded audio to the intercom |
| Communications System | Provides ability to create manual or dynamic channels of group of users and send text message |
| Vendor 1 - Access Control System | Provides ability command and monitor the turnstiles |
| Vendor 2 - Access Control System | Provides ability command and monitor the turnstiles |
| Audio-visual System | Provides ability to show preconfigured content on IPTV displays and scoreboard |
| Vendor 3 - Access Control System | Provides ability command and monitor the turnstiles |
| Vendor 4 -Access Control System | Provides ability command and monitor the turnstiles |
| Intercom/Help Point System 2 | Provides ability to monitor the status and send prerecorded audio to the intercom |

The following are examples of alarm types that can be included in various embodiments herein and handled by the teachings herein: Authentication Failure, Failed Ticket Retrieval from Source, Invalid Ticket Data, SEACS Unreachable, Invalid SEACS Credentials, Failure to pull ticket statistics from SEACS, Ticket Push Failure to SEACS, Crowd Detected, Battery level low, Boundary Breach, Sensor Unreachable, Person-Boundary Breach, SLA Breach, controller failure, ControllerFailure, ControllerFailureReturn, ControllerInput1Anomaly, ControllerTamperAlarm, ControllerTamperAlarmReturn, DoorCarddenied, DoorCarddisabled, DoorDisabled, DoorExceededPlNretries, DoorGatewayforcedopen, DoorGatewaylocked, DoorGatewaynotclosed, DoorGatewayopen, DoorOutoforder, DoorPlNcodeerror, DoorTransitdenied, DoorTransitunderduress, DoorUserdidnottransit, DoorWrongPlN, FieldActive, FieldCutalarm, FieldShortcircuitalarm, FieldTamperalarm, ZoneControl, ZoneDisarmed, ZoneEmergency, ZoneLocked, ZoneLockedEntry, oneLockedExit, ZoneNormal, ZoneOpenEntry, ZoneOpenExitDefault, CommandControl, CardGranted, CardDenied, Alarm, PVHigh, LoRange, HiRange, PVLow, XMTHigh, XMTLow, CommunicationError, CommunicationStopped, CommunicationStarted, BookmarkReferenceRequested, LiveClientFeedRequested, LiveClientFeedTerminated, ManualRecordingStarted, ManualRecordingStopped, MotionStartedDriver, MotionStoppedDriver, MotionStarted, MotionDetected, MotionStopped, OutputActivated, OutputChanged, OutputDeactivated, RecordingStarted, RecordingStopped, SettingsChanged, SettingsChangedError, RequestPlayAudioMessage, RequestStartRecording, ArchiveUnavailable, DatabaseDeletingRecordingsB eforeSetRetentionSize, DatabaseDeletingRecordingsBeforeSetRetentionTime, FailoverEncryptedCommunicationError, FailoverStarted, FailoverStopped, ServiceAvailableCritical, ServiceAvailableNormal.

In some embodiments, the unified operations center 116 (e.g., as in FIG. 10 or FIG. 1) is enabled to adjust alarm status for each alarm, for example based on time elapsing and/or based on user inputs to the user interface 112. The alarm status can be adjustable across the statuses shown in the following table:

| Status | Description |
|---|---|
| Active (System Generated) | Default state of the alarm. Each alarm that processed through alarm suppression logic, will maintain by default "Active" state. |
| Duplicate (User selected) | Operator verifies and considers this as a duplicate alarm. |
| False (User selected) | Operator verifies and considers this as a false alarm. |
| Ignore (User selected) | Operator verifies and considers this alarm as not interested. |
| Resolved (User selected) | Operator verifies and considers this alarm as resolved. |
| Abandoned (System Generated) | Threshold mentioned in section 3.2 would be configured in UOC as well. If the alarms status is active and not addressed for threshold duration and no active alarms generated from OT/IT system with same asset ID and Alarm Type, then the unified operations center 116 will automatically mark alarm as abandoned. |

In some embodiments, the operator is allowed to change the status only a single time, with the unified operations center 116 preventing further changes after a status is selected and saved. The unified operations center 116 can prevent a user from creating an incident (e.g., requesting emergency responses) for alarms with statuses other than "active," in some embodiments.

Various interrelated functions are thereby provided by the features, systems, processes, etc. of the present disclosure which provide technological solutions to technical challenges associated with monitoring large numbers of alarms from diverse domain systems which serve complex facilities in a way that enables meaningful and timely responses to and resolution of alarms.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule Based logic and other logic to accomplish the various connection steps, processing steps, comparison steps and decision step.

What is claimed is:

1. A method for processing alarms from one or more building domain systems serving a building or facility, the method comprising:

receiving a plurality of alarms at a communications bridge between the one or more building domain systems and a cloud computing system;

generating, by the communications bridge, a label indicating at least one of the plurality of alarms as duplicative of a first alarm based on an alarm labeling rule evaluated by the communications bridge by labeling the plurality of alarms with generated times, alarm expiry times, and alarm IDs, wherein labeling the plurality of alarms with the alarm IDs comprises assigning the alarm IDs by determining whether to reuse, for a second alarm, a first alarm ID from the first alarm based on whether a second generated time for the second alarm is between a first generated time for the first alarm and an alarm expiry time for the first alarm; and sending the plurality of alarms and the label from the communications bridge to a cloud computing system; and determining an occurrence count of the first alarm by counting the at least one of the plurality of alarms labeled as duplicative; and providing a graphical user interface comprising an alarm list comprising an entry for the first alarm and the occurrence count of the first alarm.

2. The method of claim 1, further comprising generating, by the cloud computing system, the alarm list for the building or facility, wherein the at least one of the plurality of alarms are hidden from the alarm list based on the label indicating the at least one of the plurality of alarms as duplicative of the first alarm.

3. The method of claim 1, further comprising generating, by the cloud computing system, a graphical interface comprising a plurality of alarm icons overlaid on a map or three-dimensional representation of the facility, wherein the plurality of alarm icons comprise a shared icon representing both the first alarm and the at least one of the plurality of alarms labeled as duplicative.

4. The method of claim 1, wherein the plurality of alarms are associated with a first building domain system serving the building or facility, the method further comprising:

obtaining additional alarms from a second building domain system serving the building or facility; and reformatting the plurality of alarms and the additional alarms to have a common data structure.

5. A system for processing a plurality of alarms from one or more building domain systems serving a building or facility, the system comprising:

a cloud computing system; and a communications bridge providing communications between the cloud computing system and the plurality of building domain systems serving the building or facility;

wherein the communications bridge is programmed to:

generate a label indicating at least one of the plurality of alarms from the plurality of domain systems as noise by evaluating an alarm labeling rule by labeling the plurality of alarms with generated times, alarm expiry times, and alarm IDs, wherein labeling the plurality of alarms with the alarm IDs comprises assigning the alarm IDs by determining whether to reuse, for a second alarm, a first alarm ID from a first alarm based on whether a second generated time for the second alarm is between a first generated time for the first alarm and an alarm expiry time for the first alarm; and provide the plurality of alarms and the label to the cloud computing system.

6. The system of claim 5, wherein determining whether to reuse, for the second alarm, the first alarm ID from the first alarm is further based on whether the first alarm and the second alarm are for a same device or equipment unit of the plurality of domain systems.

7. The system of claim 5, wherein determining whether to reuse, for the second alarm, the first alarm ID from the first alarm is further based on whether the first alarm and the second alarm have a same alarm type.

8. The system of claim 5, wherein the cloud computing system is programmed to generate a report, wherein the report indicates a count of the plurality of alarms which share the first alarm ID.

9. The system of claim 5, wherein the cloud computing system is programmed to generate a report of the plurality of alarms by grouping at least two of the plurality of alarms based on the label.

10. The system of claim 5, wherein the cloud computing system is programmed to generate a report of the plurality of alarms using a digital twin of the building or facility and the label indicating at least one of the plurality of alarms as noise, wherein the report comprises a three-dimensional building model with icons for a subset of the plurality of the alarms overlaid on the three-dimensional building model.

11. The system of claim 5, wherein the communications bridge is further programmed to normalize the plurality of alarms from the plurality of building domain systems to have a common data structure.

12. The system of claim 5, wherein the cloud computing system is programmed to execute a rules-based fault suppression logic, wherein the cloud computing system is further programmed to automatically add a fault suppression rule to the rules-based fault suppression logic by processing the plurality of alarms using an artificial intelligence technique.

13. A communications bridge providing communications from a building system to a remote computing resource, the communications bridge configured to:

obtain a plurality of alarms from the building system;

provide a label for a second alarm of the plurality of alarms by reusing, for the second alarm, a first alarm ID from a first alarm in response to a generated time of the second alarm being between a generated time of the first alarm and an alarm expiry time of the first alarm; and provide the plurality of alarms and the label from the communications bridge to the remote computing resource.

14. The communications bridge of claim 13, wherein reusing, for the second alarm ID, is further based on the first alarm and the second alarm having a same alarm type.

15. The communications bridge of claim 13, wherein the first alarm and the second alarm are for a same device of the building system.

16. The communications bridge of claim 13, wherein the communications bridge is further configured to:

obtain additional alarms from an additional building system serving the facility; and reformat the plurality of alarms and the additional alarms to have a common data structure.

17. The method of claim 1, wherein determining whether to reuse, for the second alarm, the first alarm ID from the first alarm is further based on whether the first alarm and the second alarm are for a same device or equipment unit of the plurality of domain systems.

18. The method of claim 1, wherein determining whether to reuse, for the second alarm, the first alarm ID from the first alarm is further based on whether the first alarm and the second alarm have a same alarm type.

* * * * *